United States Patent [19]
Gambardella et al.

[11] Patent Number: 5,901,843
[45] Date of Patent: *May 11, 1999

[54] DISPLAY PACKAGE

[75] Inventors: John Gambardella; Melanie Moore; Alan B. Parnell, all of Charlotte, N.C.

[73] Assignee: Specialty Packaging, Charlotte, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,969

[22] Filed: Dec. 24, 1996

Related U.S. Application Data

[63] Continuation of application No. 08/586,189, Jan. 16, 1996.

[51] Int. Cl.⁶ .................................................. B65D 85/30
[52] U.S. Cl. ........................................ 206/308.1; 206/312
[58] Field of Search .............................. 206/307, 308.1, 206/309, 311, 312, 313; 226/309

[56]  References Cited

U.S. PATENT DOCUMENTS

| | | |
|---|---|---|
| 2,954,119 | 9/1960 | Goldsholl . |
| 3,057,470 | 10/1962 | Heiber . |
| 3,549,225 | 12/1970 | Scaccia . |
| 5,101,973 | 4/1992 | Martinez . |
| 5,154,284 | 10/1992 | Starkey . |
| 5,248,032 | 9/1993 | Sheu et al. . |
| 5,253,751 | 10/1993 | Wipper . |
| 5,479,732 | 1/1996 | Burtch et al. . |

*Primary Examiner*—Paul T. Sewell
*Assistant Examiner*—Nhan T. Lam
*Attorney, Agent, or Firm*—Alston & Bird LLP

[57]  ABSTRACT

A display package having one or more media items retained therein. The display package is convertible between a collapsed position which is used for shipment and storage of the media item, an open display position for displaying the media item on a generally flat surface, and a compact display position which allows the media item to be displayed in a number of positions, such as in receiving groove on a store shelf to operate as a shelf talker. The display package has a base having opposing halves each formed of a pair of spaced apart upper and lower panels which are hingedly connected together along their respective outer ends. The upper panels also hingedly connected together along their inner ends. Central portions of the inner ends of the upper panels are spaced part from each other to define therebetween an elongate slot. An upright body connected to the base selectively extends upwardly through the slot when in one of the display positions. The body has a plurality of opposing panels which collectively define a pocket adapted for receiving at least one of the media items. A protective wrap may be placed over the display carrier and the media item to protect them during shipment and handling.

11 Claims, 8 Drawing Sheets

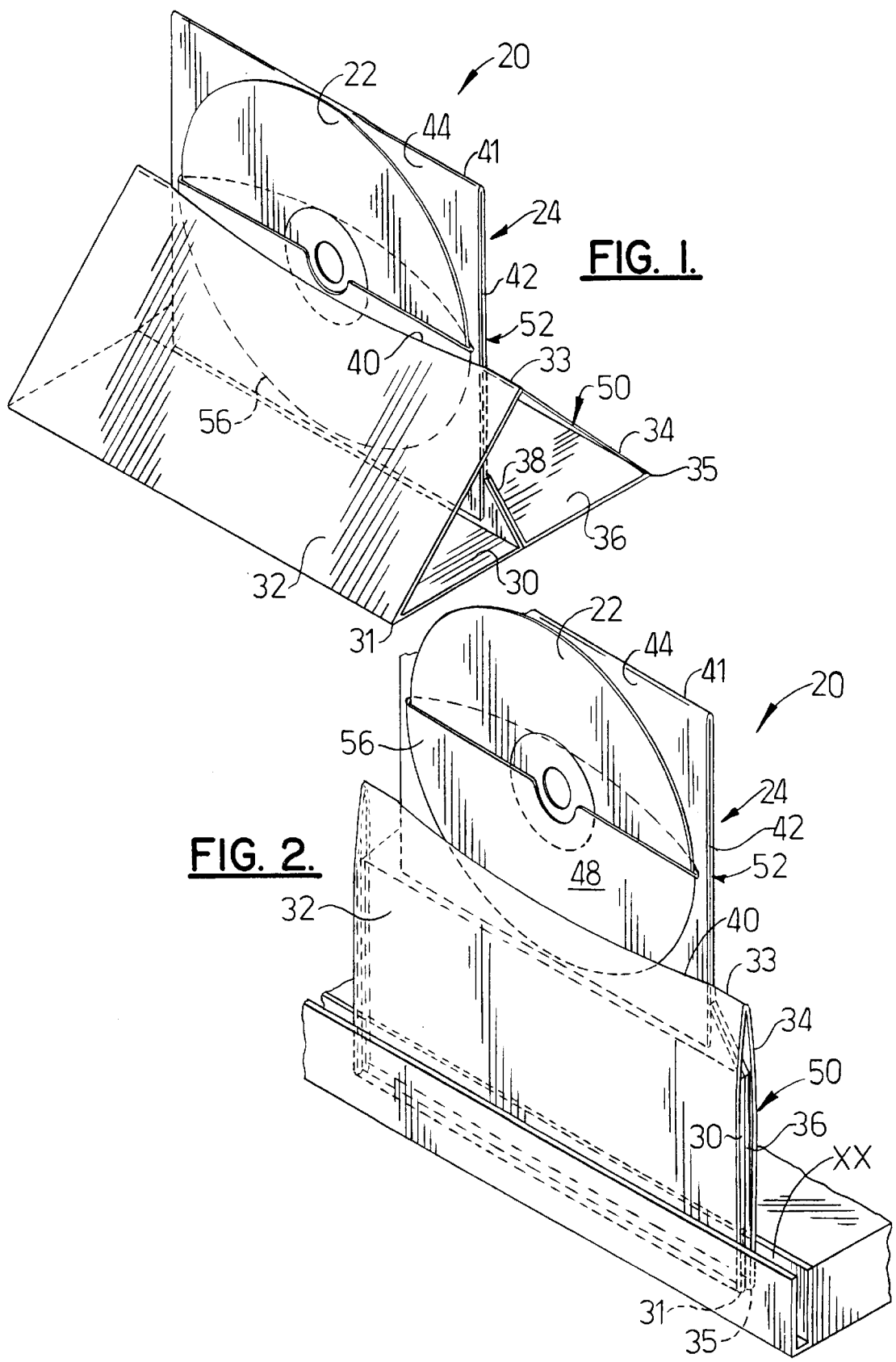

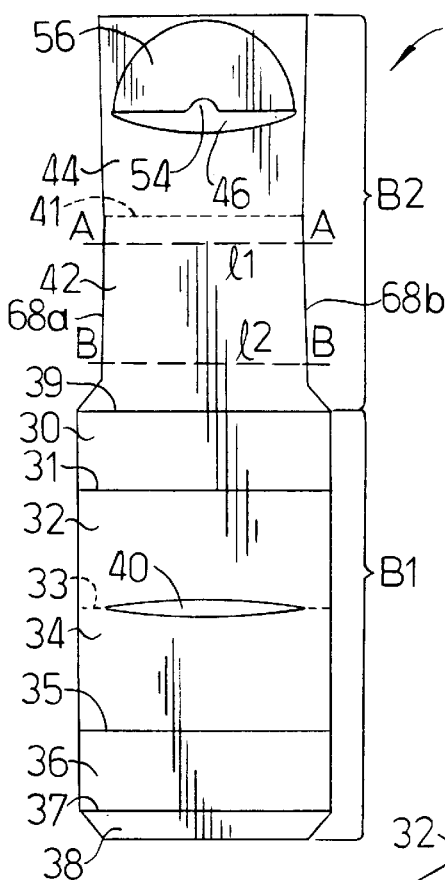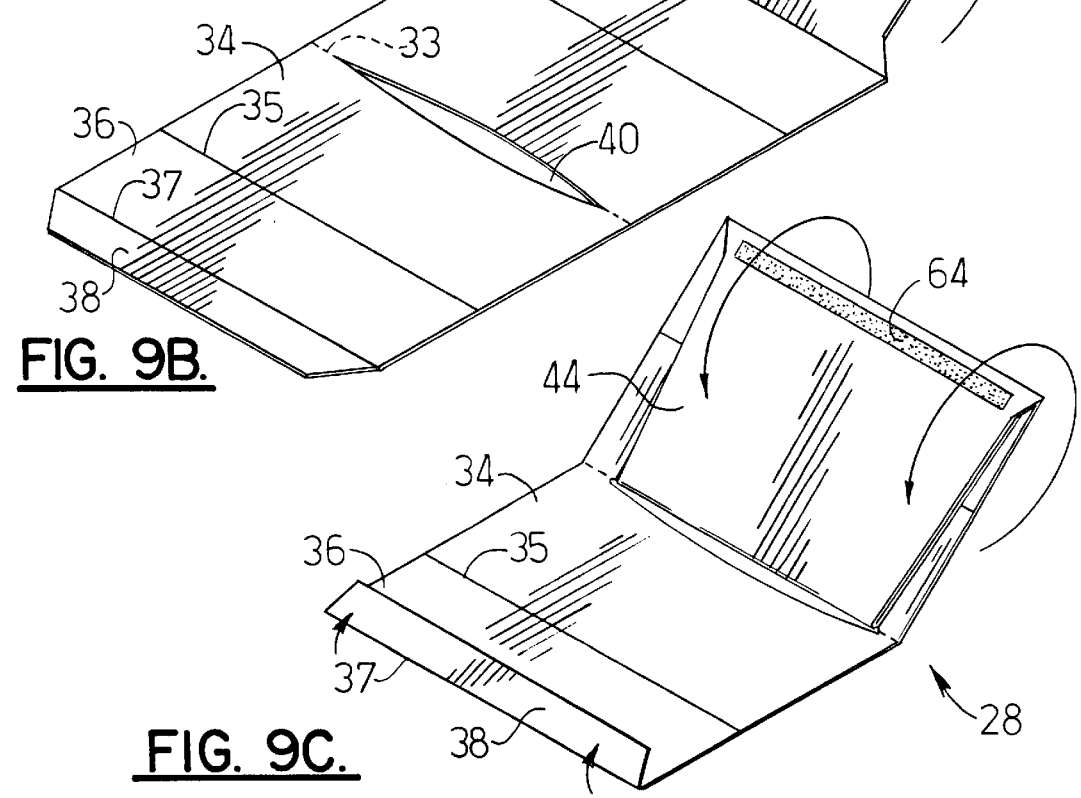
FIG. 9A.
FIG. 9B.
FIG. 9C.

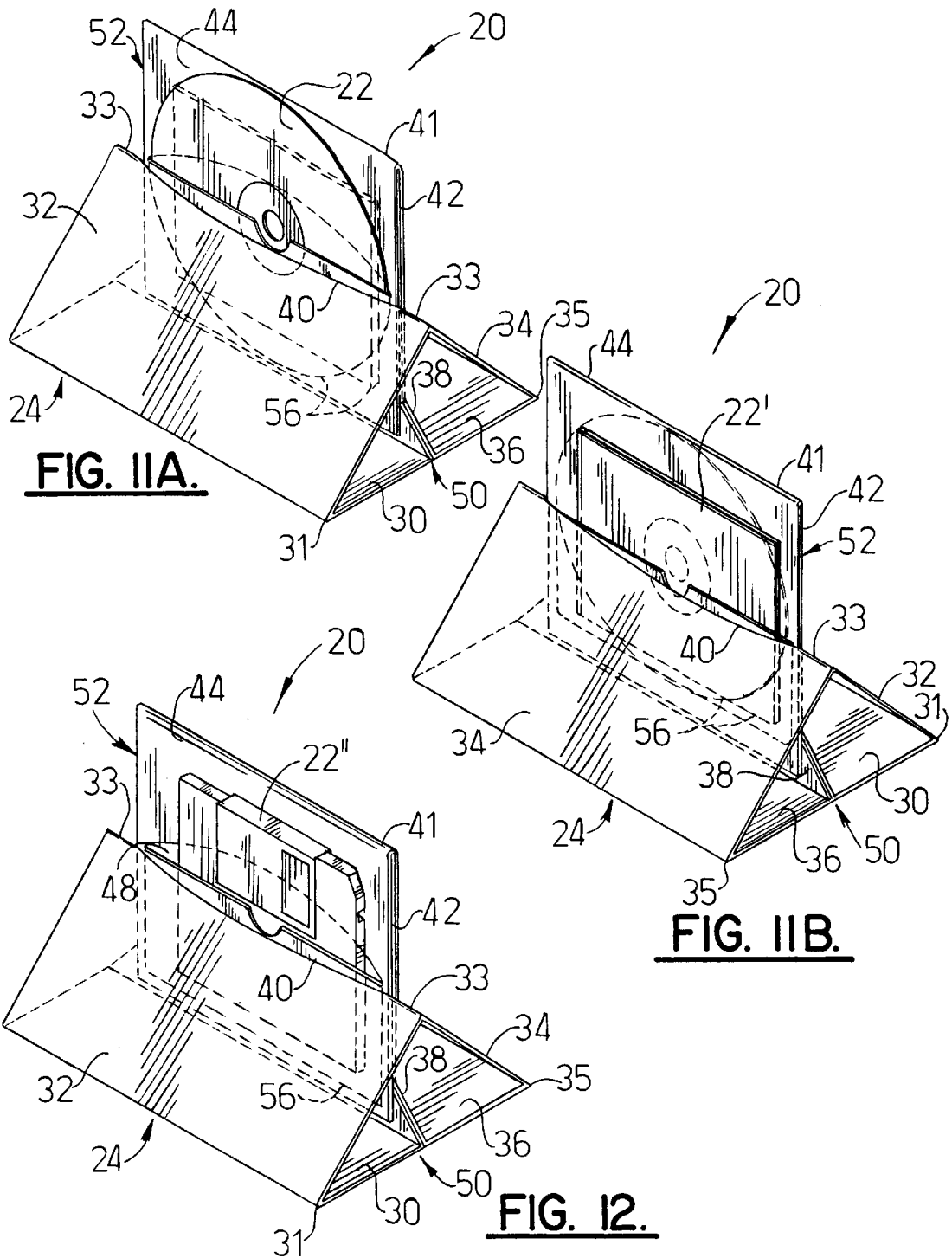

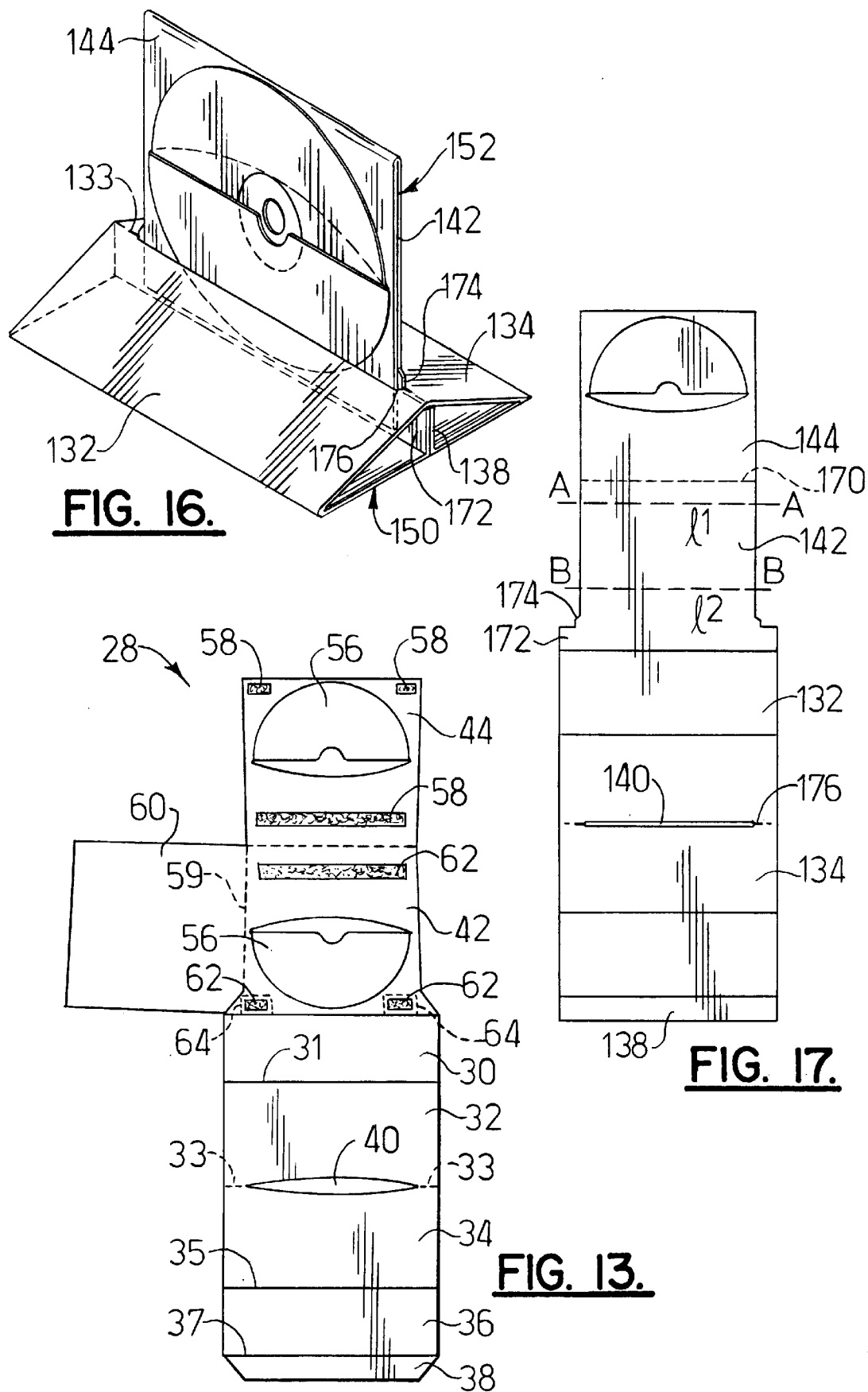

DISPLAY PACKAGE

This application is a continuation of application Ser. No. 08/586,189, filed Jan. 16, 1996.

FIELD OF THE INVENTION

The present invention relates generally to a display package, and, more particularly, to a display package, including a media item, which is readily movable between a collapsed position, for protecting the media item during shipment and handling, and one of an open display position and a compact display position for displaying the media item.

BACKGROUND OF THE INVENTION

The ability to pleasingly display a product in a package so as to entice consumers to purchase the product, the ability to adequately protect the product in the package during shipment and handling, and environmental concerns over the waste of materials used to manufacture such packages are, in today's world, constantly in conflict. This is especially true with regard to items such as plastic cards, sample products, computer games, and music discs, collectively referred to as media items. In each case, the seller or provider of the media item is interested in providing the consumer with a package which is capable of protecting the media item from damage during shipment and handling, such as on the store shelf, and providing a package which is sufficiently attractive so as to entice the consumer to purchase the product.

Media items, such as video games, are frequently packaged in carriers, such as a paperboard box, which often have dimensions exceeding 8×2½×9 inches. These carriers are used even though a video game or similar computer program typically includes either a CD ROM disc having a diameter of less than 5" or a 3½" computer diskette, and an instructional booklet of usually no more than twenty pages. The problem is made worse because in order to retain the CD ROM and the related instructional booklet in place, additional material, often paperboard or corrugated, is placed inside the carrier. Although the marketing and promotional requirements are well met by such large carriers, the waste of materials is dramatic.

In the music industry, promotional CDs are frequently packaged in plastic jewel cases. Although the jewel cases are useful in protecting the CD from damage during shipment and handling, because of their construction, they are difficult to open, often break, and are not environmentally friendly.

Similarly, in the food and beverage, and fragrance and cosmetic industries, prepackaged product samples are frequently inserted or secured, such as by stapling to cards which are used to ship these media items to retail outlets and/or consumers. Unfortunately, the shipping cards do not provide very good protection for or handsomely display the media item.

Prior to the advent of CDs, music was sold in the form of phonograph records. U.S. Pat. Nos. 3,057,470 and 3,549,225 disclose the use of phonograph holders which receive a protective envelope surrounding the phonograph record so that in a shipping and/or storage position the protective envelope is covered by the holder to protect the protective envelope. In addition, each patent discloses the holder in an erected position which presents the protective envelope in an upright position to allow the phonograph record to be removed and inserted from the protective envelope via an opening at the top of the protective envelope. The purpose of the phonograph holders is in part to allow handling of the phonograph record by a peripheral edge thereof to thereby minimize damage thereto. However, each of the patents requires the use of a protective envelope to be secured to a central portion of the holder and, based on the configuration of the holders, each requires access to the protective envelope by means of a top opening. Furthermore, the phonograph record requires the additional protection of an outer layer, such as a transparent layer, to prevent the phonograph record from falling out of the protective envelope and the holder if the holder is inadvertently inverted or jostled during shipment and/or handling.

Consequently, the available approaches used to retain a media item for protection during shipment and handling and for handsomely advertising and/or displaying the media item, at its destination, fail in either or both of the objectives set forth above. In addition, the environmental impact of each of the aforementioned approaches is less than desirable.

SUMMARY OF THE INVENTION

In view of the foregoing background, it is therefore an object of the present invention to provide a display package which is readily movable between a collapsed position, an open display position, and a compact display position, and which is useful to protect the media item contained therein during shipment and handling and which may be used to handsomely display the media item.

These and other objects, features and advantages of the present invention are obtained by providing a display carrier for media items comprising a base having opposing halves each formed of a pair of spaced apart upper and lower panels hingedly connected together along their outer ends. Respective upper panels are hingedly connected together along their inner ends. Central portions of the inner ends of the upper panels are spaced part from each other so as to define an elongate slot. An upright body is connected to the base and extends upwardly therefrom through the slot. The body comprises a plurality of opposing panels which defines a pocket adapted for reception therein of a media item.

Preferably the pocket includes an access opening in a medial portion thereof to allow for inserting and removing the media item from the display carrier. It is advantageous for the plurality of panels to define one or more pockets on one or more of the opposed sides of the body to receive and retain one or more media items.

Embossing of a portion of the pocket, in conjunction with an elliptical shape of the elongate slot, assists in loading a media item into the display carrier when in a collapsed position. The embossing also assists in reducing damage to the media item caused by frictional engagement between the display carrier and the media item. The shape of the pocket allows the media item to be securely retained within the display carrier even after a protective wrap has been removed.

As is readily understood by those skilled in the art to which the invention relates, it is important for the upper and lower base panels to have a collective width at least substantially equal to a length of the body so that the body and any media item contained therein is substantially encased thereby when the display carrier is in a collapsed position. To provide additional protection to the display carrier and the media item during shipment, it is beneficial to enclose or encase the display carrier and the media item in a protective wrap.

Although the carrier can be manufactured from several pieces, it is advantageous to manufacture the display carrier from a unitary sheet of a material having a uniform thickness.

At least one of the plurality of body panels and preferably each of the plurality of body panels has outwardly downwardly divergingly opposed side edges to assist in retaining the display package in one of a plurality of display positions. Due to the progressively increasing frictional engagement between the elongated slot formed in the base and the divergingly angled side edges, the display package is capable of being positioned in at least two different display positions.

An open display position is preferably one wherein the pair of lower panels are generally in longitudinal alignment so as to provide a generally triangular base, when viewed from an end thereof, to support the display package on a generally flat surface. The open display position preferably comprises a triangle. Such a configuration provides both a stable support for the media item and a large display area on which advertising and/or informational material may be applied.

Advantageously, a compact display position is one wherein the outer ends of the pair of spaced apart upper and lower panels are located adjacent one another. In this position, the display package can be inserted into a groove or similar receiving slot, such as on a store shelf, to be used as a shelf talker, or be used to stack a number of packages for display in a confined area without removing the protective wrap. Alternatively, because of a mounting aperture located adjacent an upper end of the body when in one of the erected positions, the display package can be readily mounted to a wall or hung by a string from above.

Ideally the blank for forming a display carrier comprises a generally rectangular base having a plurality of panels, such that a first base panel and a second base panel are hingedly connected along a common fold line. A third base panel and a fourth base panel are similarly hingedly connected along a common fold line. A center portion of the second base panel and the third base panel preferably define an elongated slot. A connecting panel is advantageously hingedly connected to the base panel along a common fold line. The blank also includes a body having a plurality of panels, such that a first body panel and a second body panel are hingedly connected along a common fold line. One of the first body panel and the second body panel beneficially define an access opening therein along a medial portion thereof. It is also possible to provide a plurality of juxtaposed body panels to form a pair of pockets for each receiving one or more media items. As a result of the features of the present embodiments of the invention, the display package is extremely versatile.

BRIEF DESCRIPTION OF THE DRAWINGS

Some of the objects, features and advantages of the present invention having been stated, others will appear as the description proceeds, when taken in conjunction with the accompanying drawings in which;

FIG. 1 is a side view in perspective of the display package shown in an open display position in accordance with the present invention;

FIG. 2 is a view similar to that shown in FIG. 1 illustrating the display package in a compact display position;

FIG. 9A is a top plan view of a blank used in forming a display carrier having a pocket located on one of the opposed sides of the body;

FIG. 9B is a side view in perspective of the blank shown in FIG. 9A illustrating gluing locations and the first fold to be made in forming the display carrier;

FIG. 9C is a side view in perspective of the blank shown in FIG. 9B illustrating additional gluing locations and the second fold to be made in forming the display carrier;

FIG. 11A is a side view in perspective and partially in phantom showing the display carrier formed from a blank similar to that shown in FIG. 8, having a pair of opposed pockets of different shapes to receive a different media item, namely, a CD and a booklet received in each pocket;

FIG. 11B is a side view in perspective similar to that shown in FIG. 11A illustrating an opposed face of the display package;

FIG. 12 is a side view in perspective and partially in phantom illustrating a display package having a computer diskette received therein;

FIG. 13 is a top plan view of an alternative embodiment of a blank used to form a display carrier having two opposed pockets;

FIG. 16 is a side view in perspective and partially in phantom illustrating an alternative embodiment of the display carrier in accordance with the present invention; and FIG. 17 is a top plan view of a blank used to form the display carrier shown in FIG. 14.

DESCRIPTION OF THE PREFERRED EMBODIMENT

Figure 3:
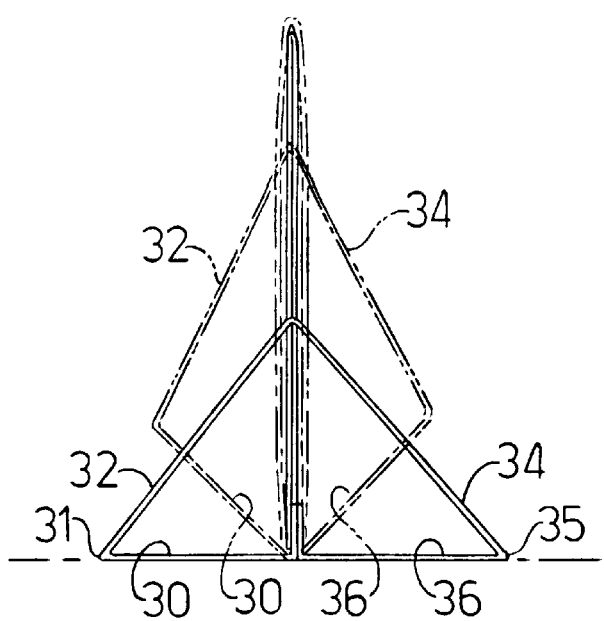
FIG. 3 is an end view of the display package shown in FIG. 1, illustrating, in phantom, the collapsed and intermediate positions of the display package as it moves from the collapsed position to the open display position.

The present invention will now be described more fully hereinafter with reference to the accompanying drawings, in which the preferred embodiment of the invention is shown. This invention may, however, be embodied in different forms and should not be construed as limited to the embodiments set forth herein. Rather, the illustrative embodiment is provided so that this disclosure will be thorough and complete, and will fully convey the scope of the invention to those skilled in the art. Like numbers refer to like elements throughout.

Referring to FIGS. 1, 2, 5, and 6, a display package, generally indicated as 20, is shown having a media item 22, retained therein. As set forth herein, a media item includes, but is not limited to, electronic discs, music discs, computer diskettes, booklets, prepackaged food samples, prepackaged beverage samples, prepackaged cosmetic samples, prepackaged fragrance samples, prepackaged tobacco products, plastic and/or paper cards and photographs.

The display package 20 includes a display carrier, generally indicated as 24, which is adapted to receive the media item 22. To protect the display carrier 24 and the media item 22 during shipment and handling, a wrap 26 is used to encase the display package 20. Typically, the wrap 26 is applied by shrink wrapping or the like so as to provide a plastic barrier to the elements. It is desirable for the wrap 26 to be transparent or at least translucent so that the display package 20 can be easily seen therethrough.

As best shown in FIGS. 1, 2, and 9A, the display carrier 24 of the present embodiment is formed from a blank, generally indicated as 28, which is made from a unitary material of uniform thickness. In this embodiment, the material is paperboard (12 or 14 point SBS C2S). It is to be understood that a different quality, color, or gauge of paperboard or alternative materials such as plastic or a light metal alloy, or a combination thereof, may be used to make the display carrier within the spirit of the invention, so long as the material used is capable of being cut and folded while retaining the desired shape of the display carrier. It is also to be understood that a coating or other surface treatment need not be used at all or may only be on one side of the paperboard without departing from the spirit of the invention.

The blank has a base forming portion $B^1$ and a body forming portion $B^2$. The base forming portion $B^1$ includes a plurality of serially arranged panels and has a generally rectangular configuration. A first base panel 30 is integrally formed and hingedly connected, along a common fold line 31, to a second base panel 32. The second base panel 32 is in turn integrally formed with and hingedly connected, along a common fold line 33, to a third base panel 34. The third base panel 34 and a fourth base panel 36 are integrally formed with and hingedly connected, along a common fold line 35, to each other. A connecting panel 38 is integrally formed with and hingedly connected, along a common fold line 37, to the fourth base panel 36. The connecting panel 38 forms an outer lengthwise extent of the base forming portion $B^1$ and the blank 28. An elongate slot 40 is defined in a central portion between the second base panel 32 and the third base panel 34.

The body forming portion $B^2$ also has a generally rectangular configuration as shown in FIG. 9A. The body forming portion $B^2$ includes a first body panel 42 which is integrally formed with and hingedly connected, along a common fold line 39, to the first base panel 30. The first body panel 42 is also integrally formed with and hingedly connected, along a common fold line 41, to a second body panel 44.

In the embodiment shown in FIG. 9A, the second body panel 44 has a cutaway portion 46 which defines an access opening for a pocket 48 (see FIG. 12) formed by the first body panel 42 and the second body panel 44. In this instance, the second body panel 44 contains the cutaway portion 46 and therefore has less surface area than the first body panel 42, which has an uninterrupted surface area and thereby forms the back wall of the pocket 48. It is to be understood that the cutaway portion 46 may be of a wide variety of shapes without departing from the spirit of the invention. It is to also be understood that the pocket 48 may be of any desired size or shape so as to accommodate one or more media items 22 therein. As shown in FIG. 9A, the second and third base panels 32 and 34 are considerably longer than the first and fourth base panels 30 and 36. The benefit of such a configuration of the base forming portion $B^1$ is described in greater detail below.

Figure 7:
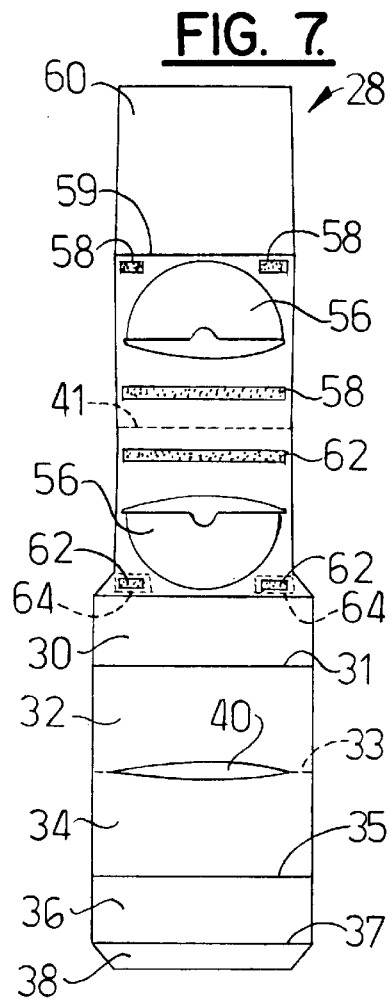
FIG. 7 is a top plan view of a blank used in forming a display carrier having pockets located on opposed sides of the body.
Figure 8:
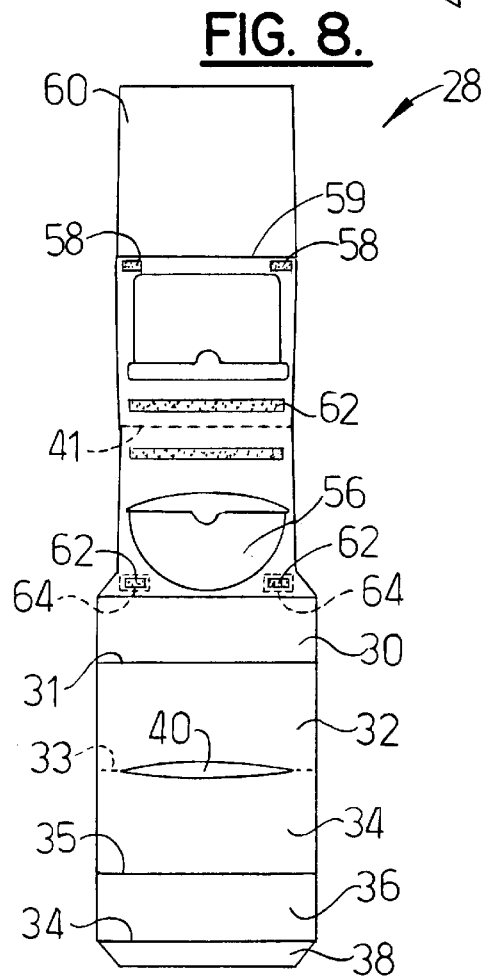
FIG. 8 is a top plan view of another embodiment of a blank used in forming a display carrier having differently shaped pockets located on opposed sides of the body.

In alternative embodiments of the blank 28, shown in FIGS. 7 and 8, the body forming portion $B^2$ also includes serially arranged panels and has a generally rectangular configuration. It is to be understood however, that in each embodiment of the blank 28 that the body panel which contains the cutaway portion 46 may have a different shape. For example, it is possible to round upper corners of the body panel or make similar variations in the shape of the body panels and still remain within the spirit of the invention.

Figure 9D:
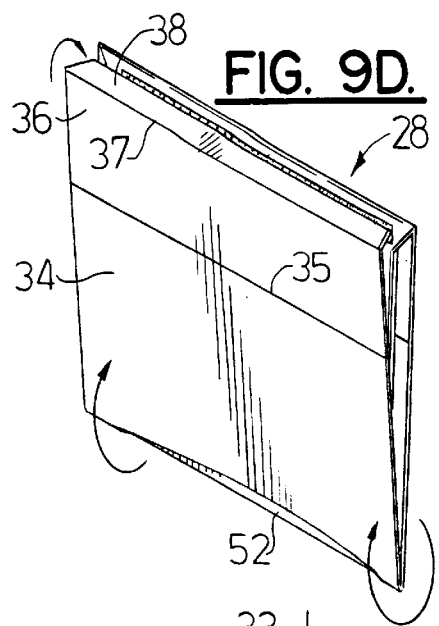
FIG. 9D is a side view in perspective of the blank shown in FIG. 9C illustrating the final fold to be made in forming the display carrier.
Figure 9E:
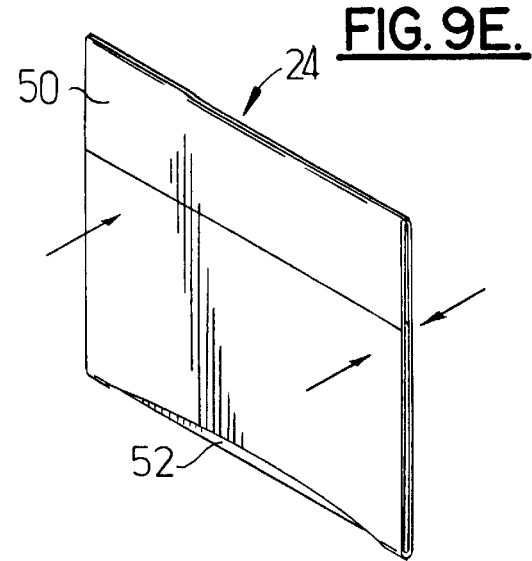
FIG. 9E is a side view in perspective of the blank shown in FIG. 9D once the folding and gluing have been completed.
Figure 10A:
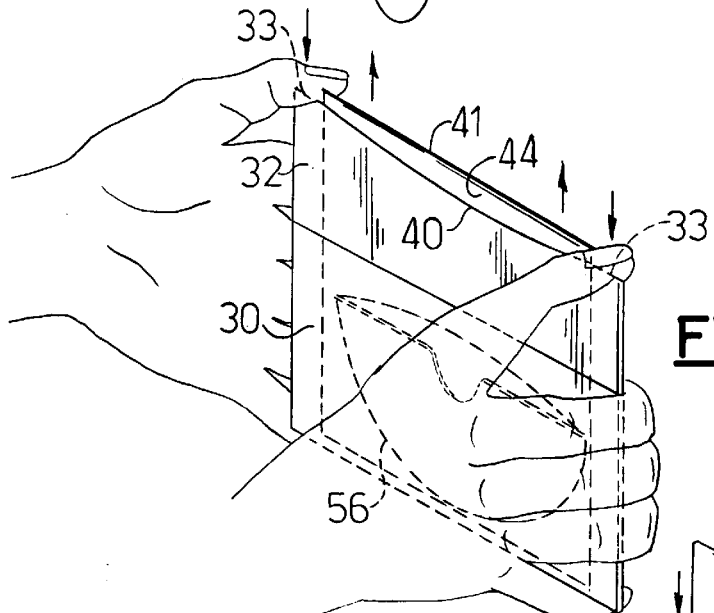
FIGS. 10A and 10B are each a side view in perspective and partially in phantom of the display carrier illustrating how the display carrier moves from the collapsed position to one of the display positions.
Figure 10B:
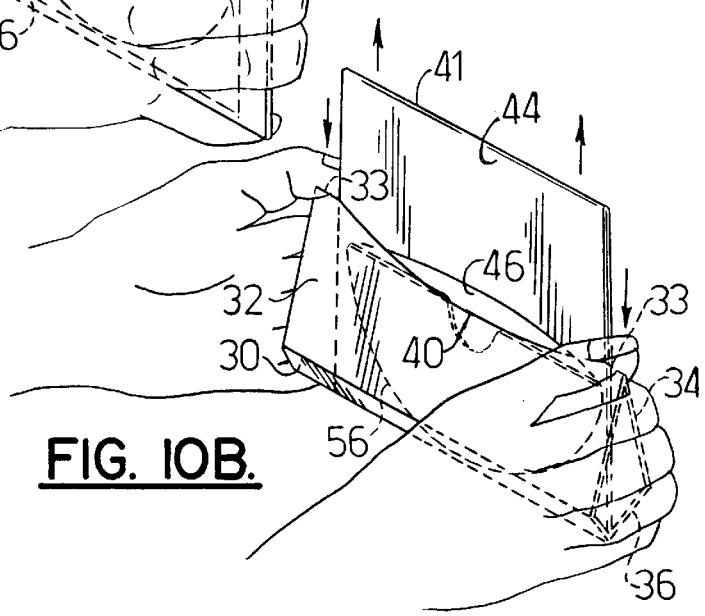

By comparing FIGS. 9A through 9E, it may be seen how the blank 28 is folded and glued to form the display carrier 24. As shown in FIG. 9B, glue or other adhesive is applied to first glue locations 58 on the second body panel 44. Once the glue has been applied, the second body panel 44 is folded along the common fold line 41 into registration with the first body panel 42. The common fold line 41 is creased to enable the second body panel 44 to fold onto the first body panel 42 while retaining a secure upper portion or tip formed by the common fold line 41.

In the embodiment shown in FIG. 13, once the glue has been applied to the first glue locations 58, a third body panel 60 is folded over into registration with the first body panel 42, along a common fold line 59, which is also creased. Thereafter, glue is placed in second glue locations 62 and the second body panel 44 is folded, along the common fold line 41, into registration with the first body panel 42.

Similarly, in the embodiments shown in FIGS. 7 and 8, once glue or other adhesive has been applied to the first glue locations 58, the third body panel 60 is folded over into registration with the second body panel 44 along a common fold line 59, which is also creased. Thereafter, glue or other adhesive is placed in second glue locations 62 and the glued second and third body panels 44 and 60 are folded into registration along the common fold line 41 between the first body panel 42 and the second body panel 44. The embodiments shown in FIGS. 7, 8, and 13 each disclose the use of three juxtaposed body panels 42, 44, and 60, to form two pockets 48, one located on each side of the display carrier 24 and wherein one of the body panels, for example third body panel 60, in FIGS. 7 and 8, is uninterrupted and acts as a back wall for each of the pockets. It is to be understood that one or more pockets 48 of varying shapes and sizes may be formed in the display carrier 24 without departing from the spirit of the present invention.

In each of the embodiments shown in FIGS. 9C, 7, 8, and 12, the plurality of body panels are secured together to form a body 52. The body 52 is then folded, along the common fold line 39, between the first body panel 42 and the first base panel 30, so that the body overlies the first base panel and the second base panel 32. In this position, the tip, i.e., the common fold line 41, of the body 52 extends partially into the elongate slot 40. The common fold line 39 is a cut/score line, such that there is a 50% cut which allows the body 52 to be easily folded during manufacture and allows the body to easily be moved as will be described below in greater detail.

The connecting panel 38 is then folded, along the common fold line 37, over the fourth base panel 36. This common fold line 37 is also a 50% cut/score line. Thereafter, glue or other adhesive is applied to third glue locations 64 on a lower portion of the second body panel 44. With respect to the embodiment of the blank 28 shown in FIG. 9C, it is only the second glue location, but for sake of consistency, it is being referred to as the third glue location 64. The third base panel 34 and the fourth base panel 36 and the lower portion of the second body panel 44 are moved into registration with each other and secured together by the third glue location 64. The manufacture of the display carrier 24 is then complete.

The common fold lines 31 and 35 are also 50% cut/score lines, whereas the common fold line 33 is a crease. As is readily understood by those skilled in the art to which the invention relates, each of the common fold lines may be creases, cut/score lines or interrupted cut lines (not shown) as desired. The use of 50% cut/score lines and the crease lines in the present invention were chosen to obtain the desired combination of strength and ease of manufacture and use. Applicants' acknowledge that several alternative combinations would be acceptable without departing from the spirit of the invention.

As shown in FIGS. 1 and 2, once the blank 28 has been folded and glued, the resultant display carrier 24 includes a base 50 and a body 52. The base 50 has a pair of opposed halves each formed of a pair of spaced apart upper panels formed from the second base panel 32 and the third base panel 34, and a pair of spaced apart lower panels formed from the first base panel 30 and the fourth base panel 36. The pair of spaced apart upper and lower panels are hingedly connected together along their outer edges which are formed by the common fold lines 31 and 35, respectively. The upper panels, i.e., the second base panel 32 and the third base panel 34 are hingedly connected together along their inner ends, i.e., their common fold line 33.

The upright body 52 is integrally connected to the base 50 along the common fold line 39 and extends upwardly therefrom through the elongate slot 40. The first body panel 42 and the second body panel 44 have an opposing relationship and define therebetween the pocket 48 into which the media item 22 is received.

As shown best in FIG. 9A, the cutaway portion 46 of the second body panel 44 is located in a medial portion thereof. The cutaway portion 46 has one edge thereof having a curved or elliptical shape and the opposite edge having a straight edge with a notch 54 centrally located therein. The shape of the cutaway portion 46 is to provide an easy access opening to the pocket for the media item 22. The notch 54 enhances this access to the cut away portion 46. It is to be understood that the shape of the cutaway and the inclusion or omission of the notch may vary depending on the particular application of the display carrier without departing from the spirit of the invention.

Below the cutaway portion 46 is an embossed area 56 which helps to partially define the pocket 48 and which has a shape generally corresponding to the media item 22 to be received within the pocket. In this instance, the embossed area 56 is arcuate so as to emulate the outer edge of a CD. In the embodiment shown in FIGS. 10A, 10B, 11A, and 11B, the embossed area 56 is generally rectangular or square to receive media items 22 such as booklets 22' or computer disks 22" which have square or rectangular lower edges. It is to be understood that the embossed area 56 can have almost any desired configuration. Furthermore, the pocket 48 may be in the form of a single band of paperboard (not shown) which is formed by cutting into the body panel at opposed side edges of the band to be formed and embossing opposed ends of the band to move it away from the remainder of the body panel. The advantage of such a pocket would be to display a substantial portion of the media item while retaining it within the display carrier 24.

As illustrated in FIGS. 1 through 6 and 9E, the display carrier 24, because of the hinged connections between each of the base panels 30 and 32, 32 and 34, 34 and 36, the hinged connection between the connecting panel 38 and the first body panel 42, and because of the existence of the elongate slot 40, is movable from a collapsed position (see FIG. 9E), to a first erected or open display position (See FIG. 1), and a second erected or compact display position (See FIG. 2). The elongate slot 40 has a generally elliptical configuration which allows a portion of the body 52 to project therethrough, which helps to guide the body 52 along the desired path i.e., through the elongate slot, to ensure a smooth transition of the display carrier 24 from the collapsed position to one of the display positions. In addition, the elliptical shape of the elongate slot 40 helps in loading a media item 22 into the display carrier 24 when in the collapsed position.

In the open display position shown in FIG. 1, the base 50 provides a support for the body 52 which extends upwardly therefrom through the elongate slot 40. The opposed upper panels, namely, the second base panel 32 and the third base panel 34 are considerably larger than the lower base panels, i.e., the first base panel 30 and the fourth base panel 36. In addition, the opposed upper panels are also angled toward each other in intersecting planes. The result of this configuration is that the upper and lower panels provide a triangular configuration to the base 50. Consequently, the upper panels 32 and 34 provide opposed billboards upon which indicia can be applied. This billboard effect is enhanced by having the upper panels be oriented at an angle of between 20° and 80°, preferably approaching 60° from the horizontal. It is to be understood that this angle may vary considerably depending on the desired application of the display carrier, without departing from the spirit of the invention. The indicia can be used for a wide variety of purposes such as advertising, instructional information, or visually stimulating artwork.

FIG. 2 illustrates the display package 20 in the compact display position which is well suited for displaying the media item 22 in a confined area such as on a retail shelf where music or computer CDs are frequently stacked on end in back to back relation. Because the display package 20 is within its protective wrap 26, the customer can quickly flip through a number of display packages to locate the desired media item, without causing any damage to either the display carrier 24 or the media item 22 received therein. In addition, it is also possible to place the media item 22, such as a colorful CD, on top of, rather than in, the pocket 48 of the display carrier 24 and encase both the display carrier and the media item in the protective wrap. This arrangement allows customers to view the entire media item.

When the display carrier 24 is in the compact display position shown in FIG. 2, the upright body 52 protrudes further above the elongated slot 40. In addition, the outer ends formed by common fold lines 31 and 35 are positioned closely adjacent each other so that the pair of upper panels 32 and 34 and the pair of lower panels 30 and 36 are in generally parallel alignment with each other. Consequently, as shown in FIG. 2, either one or both of the opposed pair of upper panels 32 and 34, and the lower panels 30 and 36 can both be frictionally fitted into a receiving slot XX, so as to be used as a shelf talker or the like.

Alternatively, the display carrier can be hung by a string or the like (not shown) placed through aperture 66, from a ceiling or rafter of a retail outlet. Still another way of displaying the media item 22 in the display carrier 24 is to mount the display carrier, in the compact display position to a wall or the like by means of a fastener, such as a thumb tack (not shown).

The cooperation between the body 52 and the elongate slot 40 enables the display carrier 24 to remain in each of the display positions. At least one of the body panels has an elongate vertical edge portion 68 arranged in an outwardly and downwardly diverging relation to the elongate slot 40. In this embodiment shown in FIG. 9A, both body panels 42 and 44 have opposed vertical edge portions 68a and 68b which are arranged in an outwardly and downwardly diverging relation to each other so as to provide progressively increasing frictional engagement with opposite end portions of the elongate slot 40. The outwardly diverging relation of the opposed vertical edge portions 68a and 68b may be seen by comparing the length $l^1$ of line A—A to the length $l^2$ of line B—B. The length $l^1$ is less than the length $l^2$. As a result, as the display carrier 24 moves from the collapsed position shown in FIGS. 5 and 10A, to the open display position shown in FIGS. 1, 11A, 11B, and 12, by moving in the manner shown in phantom in FIG. 3, the opposed vertical edge portions 68a and 68b increasingly frictionally engage the adjacent edge portions of the elongate slot 40. In addition, the triangular shape of the base 50 assists in maintaining the display carrier 24 in the open display position.

Figure 4:
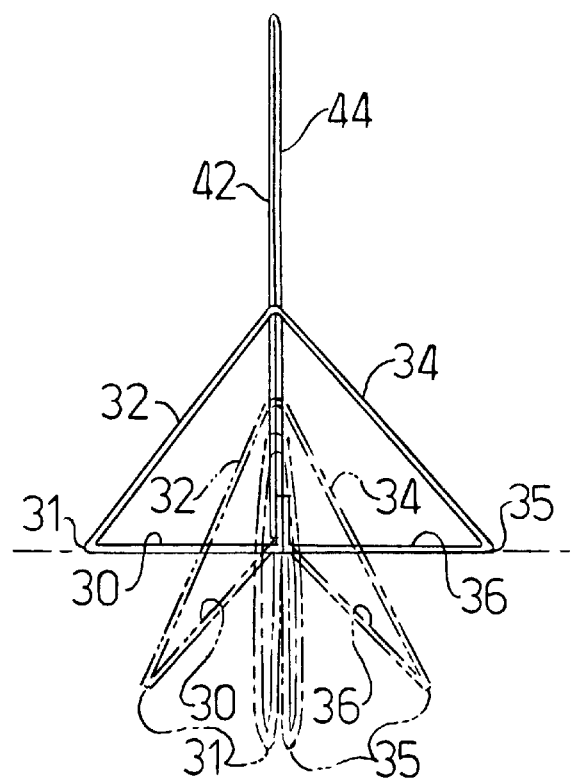
FIG. 4 is an end view similar to that shown in FIG. 1, illustrating, in phantom, the movement of the display package from the open display position to the compact display position.
Figure 5:
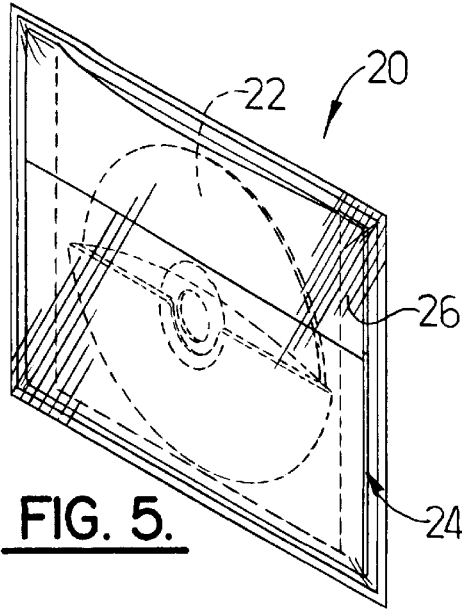
FIG. 5 is a side view in perspective of the display package in the collapsed position covered by a protective wrap, showing the media item in phantom.
Figure 6:
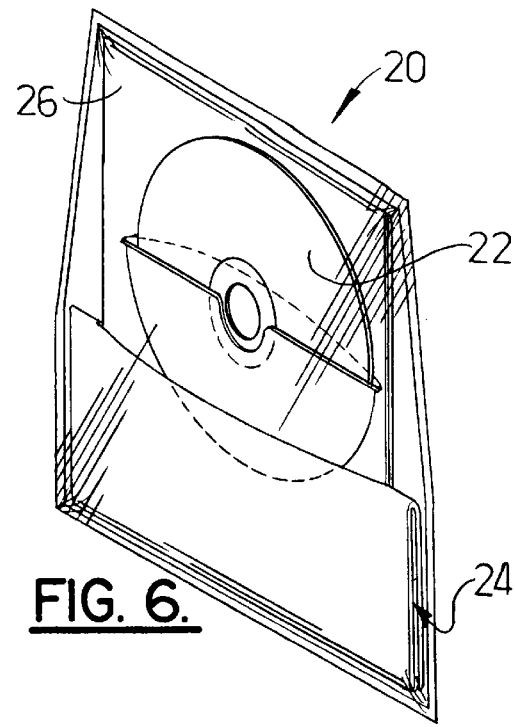
FIG. 6 is a side view in perspective of the display package shown in the compact display position covered by a protective wrap.

As the display carrier 24 moves in the manner shown in phantom in FIG. 4, i.e., from the open display position to the compact display position shown in FIGS. 2 and 6, the frictional engagement between the opposed edge portions 68a and 68b and the elongate slot 40 increases. This increased frictional engagement helps to maintain the display carrier 24 in the compact display position. It is to be understood that the outwardly and downwardly diverging opposed edge portions may be augmented by periodic notches, lances, or steps which will allow the display carrier 24 to be positioned in a multiple of predetermined intervening positions between the collapsed position and the compact display position without departing from the spirit of the present invention. One example illustrative would be a straddle display position between the open display position and the compact display position which enables the display package straddle a rounded or angled counter top or partition.

Figure 14:
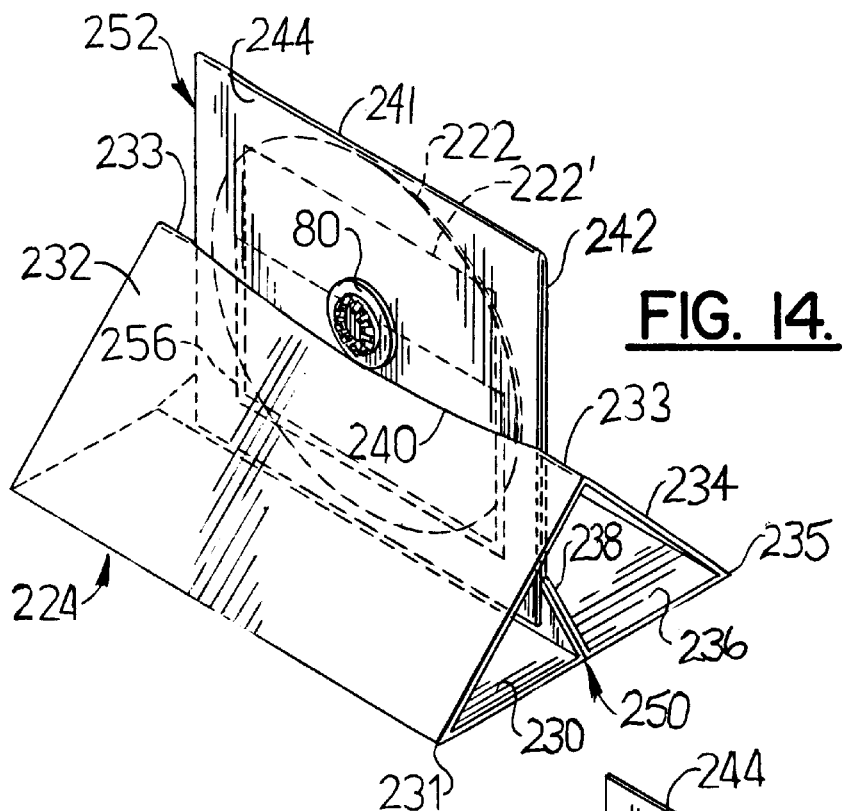
FIG. 14 is a side view in perspective showing an alternative embodiment of the present invention.

An alternative embodiment of the invention is shown in FIG. 14 wherein a pocket is provided on one side of the display carrier 224 for receiving a media item 222' such as a booklet and rather than a pocket on the opposed side of the body 252, a center retainer 80 may be mounted, which is adapted to receive and selectively retain a media item 222, such as a CD. The center retainer 80 is mounted to the body panel 244 by an adhesive or similar means. As shown, the center retainer 80 has a frusto-conical configuration which helps to position a CD thereon and helps to allow the leading edge of the elongate slot 240 travel thereover i.e., ramp over the center retainer as the display carrier 224 moves between the collapsed position and one of the display positions.

Figure 15:
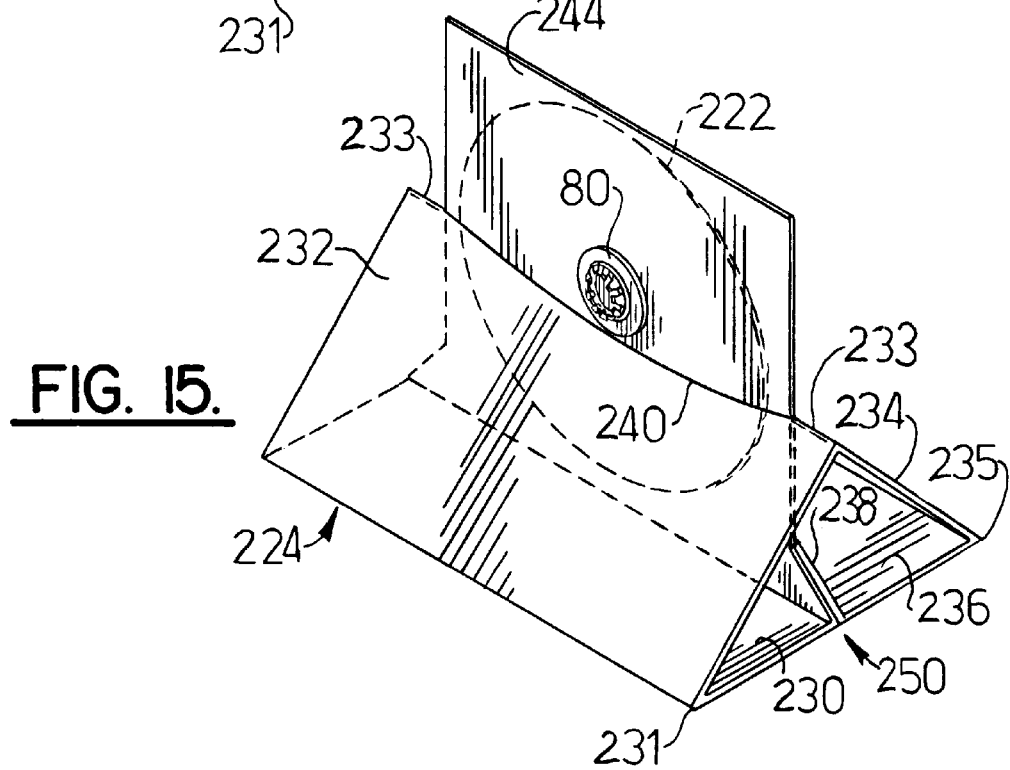
FIG. 15 is a side view in perspective showing still another embodiment of the present invention.

As shown in another embodiment of the invention in FIG. 15, it is possible to attach the center retainer 80 to a single body panel 244 without having a pocket 48 formed on the opposed side. In such a configuration, the body 252 comprises a single body panel 244 which is hingedly connected to the first base panel 230.

In still another alternative embodiment of the present invention is shown in FIGS. 16 and 17. In this embodiment, the first and second body panels 142 and 144 which form the body 152 do not have opposed side edges 168a and 168b which are outwardly and downwardly diverging as in the previously described embodiments. As may be seen, in the embodiment shown in FIGS. 16 and 17, the length $l^1$ of line A—A and the length $l^2$ of line B—B are the same. As a result, the body 152 has a generally rectangular tongue portion 170 which is sized to fit within a generally rectangularly shaped elongate slot 140, and a base portion 172 which forms shoulders located on either side of the tongue portion. Opposed tabs 174 are located on each side of the tongue portion 170 between the tongue portion and the base portion 172. As best illustrated in FIG. 16, the tabs 174 are shaped so as to engage slits 176 located at opposed ends of the slot 140. The slits 176 have a smaller width than the slot 140 to pinch and retain the tabs 174 therein when the display carrier 124 is in the erected position shown.

The blank shown in FIG. 17 contains a connecting panel, in this embodiment referred to as an end panel 138, which has the same axial width as the base portion 172 of the body 152 so as to form a common shoulder or support abutment. In the erected position, the fold line 133 between the opposed upper panels 132 and 134, rests on or abuts the support abutment formed by the combination of the base portion 172 and the end panel 138. As a result of the tabs 174 being retained within the slits 176 and the fold line 133 of the upper panels 132 and 134 resting on the support abutment, the lower panels 130 and 136 of the base 150 can not be moved passed 90° relative to the body 152. Consequently, this embodiment of the display carrier 124 can only be moved between the collapsed position and the erected position. The display carrier 124 can not be moved to the compact display position described in detail above with reference to the first embodiment. In addition, the triangular configuration of the base 150 and correspondingly the angle of the upper panels 132 and 134 is considerably different than in the previously described embodiments.

Many modifications and other embodiments of the invention will come to mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. A display carrier for media items being formed of a unitary sheet of paperboard material comprising:

a base having opposing first and second halves, said first half having an upper panel having an outer end and an inner end and a lower panel having an outer end and an inner end, said outer end of said lower panel hingedly connected to the outer end of said upper panel, said second half having an upper panel having an outer end and an inner end and a lower panel having an outer end and an inner end, said outer end of said lower panel hingedly connected to the outer end of said upper panel, said upper panels being considerably larger than said lower panels, said upper panels also being hingedly connected together along an outer portion of their inner ends, central portions of said inner ends of said upper panels being spaced apart from each other to define therebetween an elongate slot;

an upright body having upper and lower portions extending upwardly through said slot in said base, said body comprising a plurality of opposing panels defining a pocket adapted to receive a media item; and a connecting panel connecting lower portion of said body to said base, wherein said connecting panel allows the display carrier to be displayed between a collapsed display position and a compact display position, said collapsed display position defined by the outer ends of both pairs of upper and lower panels being closely adjacent each other and located in an intermediate region of said upright body thereby encasing substantially the entire upright body, said compact display position defined by the outer ends of both pairs of upper and lower panels being closely adjacent each other and located below said upright body thereby exposing substantially the entire upright body except for the lower portion of said upright body, said compact display position allowing said base to provide stability to the upright body while the display carrier is in said compact display position.

2. A display carrier according to claim 1 wherein one of said plurality panels defining a pocket is of lesser surface area than another of said panels and defines a front wall of said pocket.

3. A display carrier according to claim 1 wherein one of said opposing panels defining a pocket has an access opening in a medial portion thereof.

4. An erectable display carrier for media items being formed of a unitary sheet of paperboard material comprising:

an upright body having a plurality of opposing panels defining a pocket adapted for reception therein of a media item;

a base connected to and being adapted for supporting said body, said base having opposing first and second halves, said first half having upper and lower generally rectangular panels hingedly connected together along a common fold line at their outer ends, said second half having upper and lower generally rectangular panels hingedly connected together along a common fold line at their outer ends, said upper and lower panels having a collective width at least substantially equal to the length of said body so as to substantially encase said body, said upper panels also being hingedly connected together along their inner ends, central portions of said inner ends of said upper panels being spaced apart from each other to define therebetween an elongate slot adapted to allow said body to extend upwardly therethrough; and a display position wherein said outer ends of said pair of spaced apart upper and lower panels are located closely adjacent each other and extend below said body to thereby expose substantially the entire upright body relative to said base.

5. An erectable display carrier according to claim 4 wherein said elongate slot comprises a generally elliptical configuration and wherein an upper portion of said upright body extends above said elongate slot when the display carrier is in a collapsed position so as to guide said body through said elongate slot to one of said plurality of display positions and to facilitate loading a media item.

6. A display carrier for media items comprising:

an elongate base having two substantially opposing angular upper panels which extend toward each other in intersecting planes and which are hingedly connected together along their inner ends, central portions of the inner ends of said upper panels defining therebetween an elongate slot, and said base having opposing first and second halves, said first half having an upper panel having an outer end and an inner end and a lower panel having an outer end and an inner end, said outer end of said lower panel hingedly connected to the outer end of said upper panel, said second half having an upper panel having an outer end and an inner end and a lower panel having an outer end and an inner end, said outer end of said lower panel hingedly connected to the outer end of said upper panel;

an upright body extending upwardly from said base through said slot, said body comprising a plurality of opposing body panels defining a pocket adapted for reception therein of a media item, and said upright body having lower portions thereof being hingedly connected to one of said lower panels of said base, and the other of said lower panels having a connecting panel hingedly connected to an inner end of said other lower panel for hingedly connecting said other of said lower panels to said upright body, said connecting panel allowing the display carrier to be displayed in a compact display position, said compact display position defined when the outer ends of both pairs of upper and lower panels are closely adjacent each other and are located below said upright body thereby exposing substantially the entire upright body relative to said base.

7. A display carrier according to claim 6 wherein said plurality of opposing body panels defining a pocket define a pair of opposed pockets therebetween.

8. A display carrier according to claim 6 wherein said upper and lower panels are of rectangular construction and wherein the collective width of each of said pair of upper and lower panels is at least substantially equal to the length of said body so that said body is substantially encased thereby when said display carrier is in a collapsed position.

9. A display carrier according to claim 6 wherein each of said upper panels has a greater length than each of said lower panels.

10. A display package comprising:

a media item to be displayed;

a collapsible display carrier formed of a single piece of paperboard material including a base having opposing first and second halves, said first half having an upper panel having an outer end and an inner end and a lower panel having an outer end and an inner end, said outer end of said lower panel hingedly connected to the outer end of said upper panel, said second half having an upper panel having an outer end and an inner end and a lower panel having an outer end and an inner end, said outer end of said lower panel hingedly connected to the outer end of said upper panel, said upper panels also being hingedly connected together along their inner ends, central portions of said inner ends of said upper panels being spaced part from each other to define therebetween an elongate slot, and an upright body connected to said base and extending substantially entirely upwardly through said slot to present the display carrier in a compact display position, said body comprising a plurality of opposing body panels defining a pocket receiving said media item therein, said compact display position defined by outer ends of both pairs of upper and lower panels being closely adjacent each other and located below said upright body thereby exposing substantially the entire upright body relative to said base; and means cooperating with said body for retaining said display carrier in said compacted display position during shipment and handling.

11. A display package according to claim 10 wherein said retaining means comprises a protective wrap protectively encasing said display carrier and said media item from the environment during shipment, display, and handling.

* * * * *

UNITED STATES PATENT AND TRADEMARK OFFICE
CERTIFICATE OF CORRECTION

PATENT NO. : 5,901,843

DATED : May 11, 1999

INVENTOR(S) : Gambardella et al.

It is certified that error appears in the above-identified patent and that said Letters Patent is hereby corrected as shown below:

Title page, item [73], in the Assignee's name, before "Specialty" insert --CADMUS--.

Title page, item [63], in the Related U.S. Application Data, "08/586,189" should read --08/586,186--; after "Jan. 16, 1996" insert --, Pat. No. 5,641,063--.

Signed and Sealed this

Twelfth Day of October, 1999

*Attest:*

Q. TODD DICKINSON

*Attesting Officer*     *Acting Commissioner of Patents and Trademarks*